United States Patent Office 3,402,180
Patented Sept. 17, 1968

3,402,180
2-IMINONAPHTHO[2,3-d]-1,3-DITHIOLE-
4,9-DIONES
William Lindsay Mosby, North Plainfield, N.J., assignor to American Cyanamid Company, Stamford, Conn., a corporation of Maine
No Drawing. Filed July 23, 1965, Ser. No. 474,477
3 Claims. (Cl. 260—327)

ABSTRACT OF THE DISCLOSURE

2 - iminonaphtho[2,3 - d] - 1,3 - dithiole - 4,9 - dione compounds of the formula:

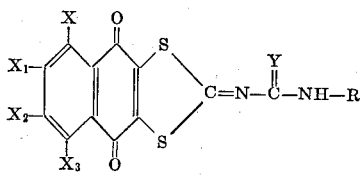

wherein X, $X_1$, $X_2$ and $X_3$ are hydrogen, halogen or lower alkyl; Y is oxygen or sulfur; and R is lower alkyl, phenyl, naphthyl, phenyl-substituted lower alkyl or lower alkyl substituted phenyl are prepared by treating a 2-iminonaphthol[2,3-d]-1,3-dithiole-4,9-dione with a substituted isocyanate or isothiocyanate. The compounds are useful as pigments, dyes, and biocides, particularly as herbicides and fungicides.

---

This invention relates to, and has for its object, the provision of a new class of compounds. More particularly, it relates to 2-iminonaphtho[2,3-d]-1,3-dithiole-4,9-diones in which the imino group is substituted by a carbamoyl or thiocarbamoyl group. The compounds of this invention are represented by the following Formula I:

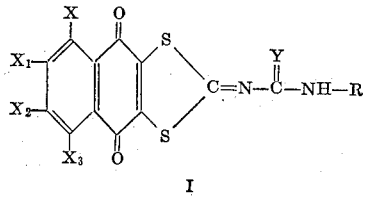

I

X, $X_1$, $X_2$ and $X_3$ are hydrogen, halogen or lower alkyl; Y is oxygen or sulfur; and R is lower alkyl or monocyclic aryl.

The compounds of this invention are highly colored, water insoluble and oil soluble, crystalline materials having high melting points. They are useful as pigments and dyes. Also, as a class, they have shown biocidal, particularly herbicidal and fungicidal, activity as exemplified hereinafter.

The compounds of Formula I can be prepared by reacting a 2-iminonaphtho[2,3-d]-1,3-dithiole-4,9-dione of Formula II with the appropriate isocyanate or isothiocyanate of Formula III as shown in the following Equation 1:

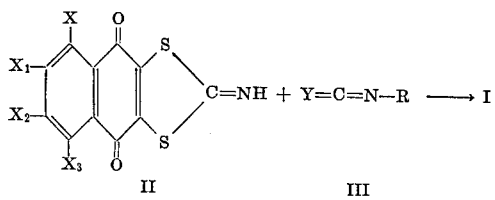

(1)

Reaction (1) is carried out in an inert solvent such as nitromethane, ethylene glycol dimethyl ether, etc. Approximately equimolecular amounts of the two reactants are used, although it is advantageous to use a slight excess of the isocyanate. The reaction temperature is not critical; ambient temperatures are normally used, but reaction can be conducted at temperatures between about 10° C. and 100° C. The products can be isolated and purified, if desired, by conventional methods.

Compounds of Formula II are prepared by reacting the corresponding arylsulfonylimino derivatives with sulfuric acid (see Examples 1 and 2). This reaction is a hydrolytic procedures and is conducted at elevated temperatures centering around the reflux point of the aqueous reaction mixture. The product is isolated by cooling, drowning in water, and separating the precipitate. It can be purified by conventional means such as washing with water and recrystallization as from nitromethane.

The 2-p-tosylsulfonyliminonaphtho[2,3-d]-1,3-dithiole-4,9-dione starting materials are prepared by addition of a mole of a dialkali metal salt of p-tolylsulfonyldithioimidocarbonic acid to a mole of 2,3-dichloro-1,4-naphthoquinone (which may be substituted by X, $X_1$, $X_2$ and $X_3$, as described above). This reaction is conducted in a solvent such as dimethylformamide at temperatures in the range of 10°–100° C.

Compounds of Formula III are isocyanates and isothiocyanates. Examples of isocyanates include methyl, ethyl, isobutyl, cyclohexyl, octadecyl, benzyl, phenyl, 2-naphthyl, etc. Examples of isothiocyanates include methyl, ethyl, secondary butyl, benzyl, phenyl, o-tolyl, 1-naphthyl, etc.

The following examples, in which parts and percentages are by weight, are presented to illustrate this invention.

EXAMPLE 1

2-iminonaphtho[2,3-d]-1,3-dithiole-4,9-dione

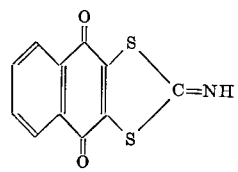

A. 2-p-TOLYLSULFONYLIMINONAPHTHO[2,3-d]-1,3-DITHIOLE-4,9-DIONE

A suspension of 4.25 parts (0.013 mole) of dipotassium p-tolylsulfonyldithioimidocarbonic acid in 20 parts of dimethylformamide is added to a solution of 2.27 (0.01 mole) of 2,3-dichloro-1,4-naphthoquinone in 25 parts of dimethylformamide at 50° C. After about one hour, the insoluble materials are filtered, washed with water and recrystallized from glacial acetic acid and nitromethane. The brown crystalline product melts at 227.5–228.5° C.

The compound, 6-methyl-2-p-tolylsulfonyliminonaphtho[2,3-d]-1,3-dithiole-4,9-dione, is obtained by the foregoing procedure by substitution of an equimolar amount of 6-methyl-2,3-dichloro-1,4-naphthoquinone for the quinone used in Part A.

B. THE PRODUCT

A solution of 0.18 part of 2-p-tosylsulfonyliminonaphtho[2,3-d]-1,3-dithiole-4.9-dione (product of Part A) in 2.0 parts of concentrated sulfuric acid is heated to 100° C. and about 0.2 part of water is carefully added. The reaction mixture is cooled and poured into about 5 parts of water. The red precipitate is separated, washed and recrystallized from nitromethane. The product melts at 200.5–201.5° C.

The corresponding 6-methyl analog of the product is prepared by substitution of 6-methyl-2-p-tosylsulfonyliminonaphtho[2,3-d]-1,3-dithiole-4,9-dione in the procedure of Part B.

EXAMPLE 2

2-imino-5,6,7,8-tetrachloronaphtho[2,3-d]-1,3-dithiole-4,9-dione

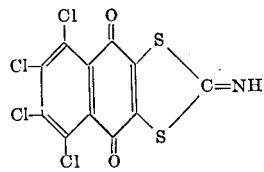

A. 2-p-TOSYLSULFONYLIMINO-5,6,7,8-TETRACHLORONAPHTHO[2,3-d]-1,3-DITHIOLE-4,9-DIONE

The procedure of Part A of Example 1 is followed, substituting 3.65 parts of hexachloro-1,4-naphthoquinone for the 2,3-dichloro-1,4-naphthoquinone. The product, after recrystallization from toluene, melts at 285.8–287.8° C.

B. THE PRODUCT

The general procedure of Part B of Example 1 is followed, substituting an equivalent amount of 2-p-tosylsulfonylimino - 5,6,7,8 - tetrachloronaphtho[2,3 - d] - 1,3-dithiole-4,9-dione (product of Part A above) for the 2-p-tosylsulfonyliminonaphtho[2,3-d] - 1,3 - dithiole - 4,9-dione. The reddish product, after recrystallization from chlorobenzene, melts at 245° C.

EXAMPLE 3

2-phenylcarbamoyliminonaphtho[2,3-d]-1,3-dithiole-4,9-dione

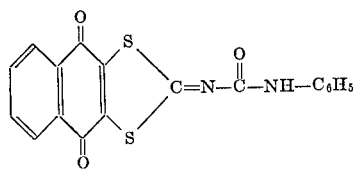

A mixture of 0.494 part (0.002 mole) of 2-iminonaphtho[2,3-d]-1,3-dithiole-4,9-dione (product of Example 1), 0.30 part (0.0025 mole) of phenyl isocyanate and about 6 parts of nitrobenzene is boiled for a few minutes. The precipitate is separated and recrystallized from pyridine. The purple product melts at 278.0–278.5° C.

EXAMPLE 4

2-methylcarbamoyliminonaphtho[2,3-d]-1,3-dithiole-4,9-dione

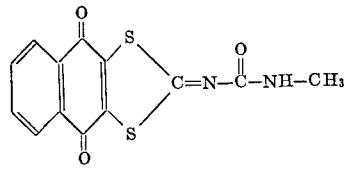

A mixture of 0.494 part (0.002 mole) of 2-iminonaphtho[2,3-d]-1,3-dithiole-4,9-dione (product of Example 1), 0.967 part (0.017 mole) of methyl isocyanate, a catalytic amount of triethylamine and about 10 parts of ethylene glycol dimethyl ether is allowed to stand a short time at ambient temperature. Ethanol is added and the precipitate is filtered and washed. The yellow product, after recrystallization from chlorobenzene, melts at 247.5–248.5° C.

EXAMPLE 5

2-phenylthiocarbamoyliminonaphtho[2,3-d]-1,3-dithiole-4,9-dione

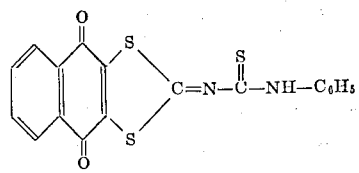

The procedure of Example 3 is followed, substituting an equivalent amount of phenyl isothiocyanate for the phenyl isocyanate. The orange product melts at 246.5–248.5° C. with decomposition.

EXAMPLE 6

The products of Examples 2 and 5, when tested by standard procedures for fungicides, show fungicidal activity (spore inhibition) as indicated in Table I.

TABLE I

|  | Percent Inhibition, 10 p.p.m. Monilina Fruticola | Percent Inhibition, 100 p.p.m. Stemphylium Sarcinaeforme |
|---|---|---|
| Example 2 |  | 50 |
| Example 5 | 100 | 100 |

I claim:
1. A compound of the formula:

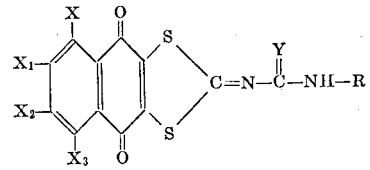

X, $X_1$, $X_2$ and $X_3$ are members selected from the group consisting of hydrogen, halogen and lower alkyl; Y is a member selected from the group consisting of oxygen and sulfur; and R is a member selected from the group consisting of lower alkyl, phenyl, naphthyl, benzyl, and tolyl.

2. The compound 2-phenylcarbamoyliminonaphtho [2,3-d]-1,3-dithiole-4,9-dione.
3. The compound 2-methylcarbamoyliminonaphtho [2,3-d]-1,3-dithiole-4,9-dione.

References Cited

Noller, Chemistry of Organic Compounds, Saunders Co., Phila., Pa. (1957), page 317.

JAMES A. PATTEN, *Primary Examiner.*